United States Patent [19]

Höppner et al.

[11] Patent Number: 4,662,071
[45] Date of Patent: May 5, 1987

[54] MOTOR-DRIVE CHAIN SAW WITH A CLUTCH AND OIL PUMP

[75] Inventors: Klaus Höppner, Marbach; Benno Tilders, Waiblingen-Hegnach; Anton Wehle, Fellbach; Günter Wolf, Oppenweiler, all of Fed. Rep. of Germany

[73] Assignee: Andreas Stihl, Waiblingen, Fed. Rep. of Germany

[21] Appl. No.: 671,236

[22] Filed: Nov. 14, 1984

[30] Foreign Application Priority Data

Nov. 19, 1983 [DE] Fed. Rep. of Germany ....... 3341834

[51] Int. Cl.⁴ .................. B23D 57/02; B27D 17/10; B27D 17/12
[52] U.S. Cl. ................... 30/381; 184/115.1; 184/33; 192/41 S; 417/319; 464/57
[58] Field of Search .................. 30/381–387; 417/319, 500; 184/15.1, 33; 192/416 S; 464/40.57

[56] References Cited

U.S. PATENT DOCUMENTS 3,111,822  11/1963  Hansen .................. 464/40
3,448,829   6/1969  Rauh et al. ............ 184/15.1

*Primary Examiner*—Douglas D. Watts
*Attorney, Agent, or Firm*—Walter Ottesen

[57] ABSTRACT

The invention is directed to a motor-driven chain saw wherein a sprocket for a saw chain and a drive wheel for an oil pump are rotatably journalled on the crankshaft. The oil pump pumps oil for lubricating the saw chain and guide bar. The sprocket and the drive wheel are driven via a clutch drum. In this arrangement, a detachable resilient connecting member is provided to connect the drive wheel of the oil pump to the clutch drum at the peripheral wall of the latter. The resilient connecting member protects the drive wheel and the oil pump from excessive wear.

22 Claims, 6 Drawing Figures

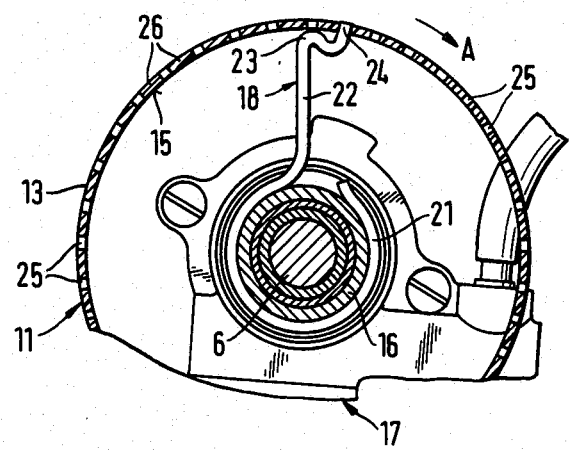
Fig. 3
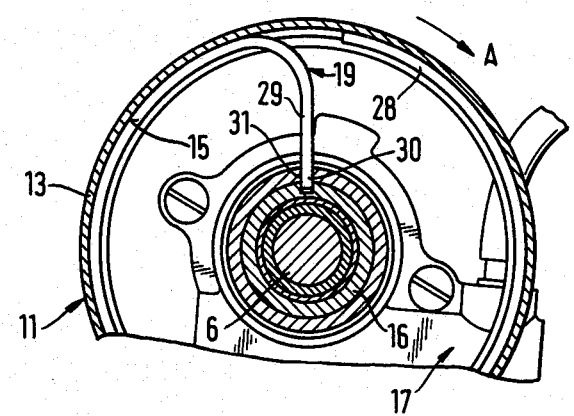
Fig. 4
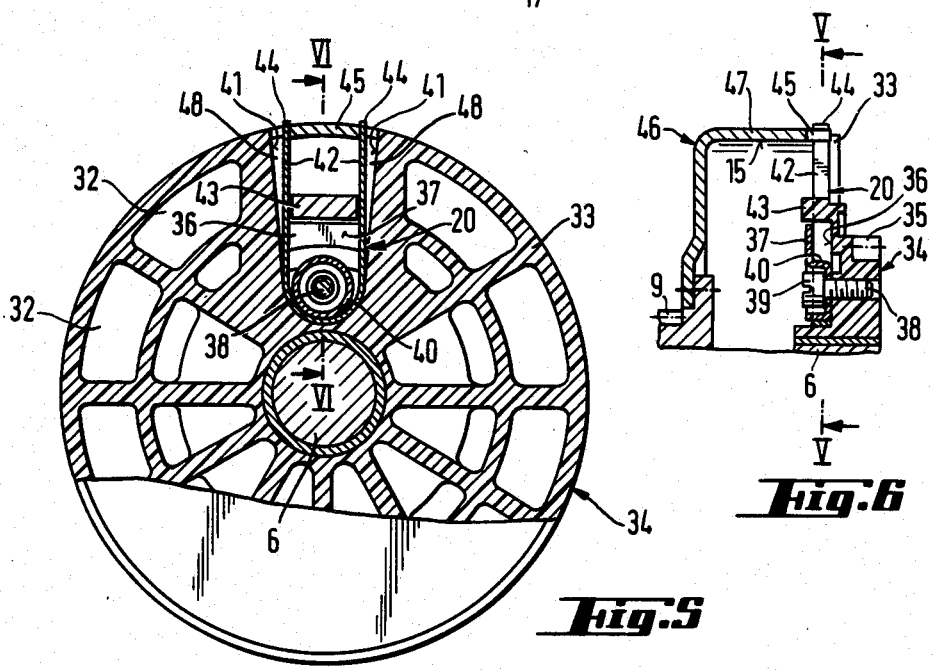
Fig. 5
Fig. 6

MOTOR-DRIVE CHAIN SAW WITH A CLUTCH AND OIL PUMP

FIELD OF THE INVENTION

The invention relates to a motor-driven chain saw having a clutch and an output drive shaft upon which a sprocket for a saw chain is rotatably journalled. A drive wheel for driving a pump for pumping lubricating oil is also mounted on the output drive shaft. The sprocket and the drive wheel are driven by a clutch drum of the clutch.

BACKGROUND OF THE INVENTION

In a motor-driven chain saw of the type disclosed in German published and examined patent application DE-AS No. 1,528,028, a centrifugal clutch is arranged at the outer output end of the crankshaft. At a suitable rotational speed, the radially movable clutch members are forced outwardly against the inner surface of the peripheral wall of a substantially cup-shaped clutch drum. The clutch drum is open at the output end of the crankshaft and includes a sprocket at its base wall. The sprocket is rotatably journalled on the crankshaft and drives the saw chain.

Adjacent to the sprocket is a drive wheel which is also rotatably journalled on the crankshaft and is rigidly connected to the sprocket in the close vicinity of the crankshaft by means of at least one axially parallel pin. The drive wheel drives a pump for pumping lubricating oil.

SUMMARY OF THE INVENTION

It is an object of the invention to provide a motor-driven chain saw of the kind described above wherein a simple connection connects the drive gear to the clutch drum and wherein the assembly is simplified.

The motor-driven chain saw of the invention is equipped with a saw chain and a guide bar for guiding the movement of the saw chain thereon. The chain saw of the invention includes: a housing; a drive motor mounted in the housing and having a motor drive shaft; pump means for pumping lubricating oil for lubricating the saw chain and the guide bar; drive means for driving the pump means, the drive means being rotatably journalled on the drive shaft; sprocket means rotatably journalled on the output shaft for driving the saw chain around the periphery of the guide bar; clutch means for operatively connecting the drive shaft to the sprocket means, the clutch means including: a clutch drum connected to the sprocket means and being rotatably journalled on the drive shaft; and, centrifugal weight means for engaging the clutch drum and sharply accelerating the latter to a predetermined rotational speed whereby the torque of the drive shaft is transmitted to the clutch drum and the sprocket means; and, resilient torque transmission means for resiliently transmitting torque from the clutch drum to the drive means for rotatively driving the latter and for transmitting the last-mentioned torque so as to prevent the sharp acceleration of the clutch drum from being transmitted to the drive means thereby protecting the drive means and the pump means from excessive wear.

Preferred embodiments and improvements as well as further advantages and essential details of the invention will become apparent from the following description, the drawing and the appended claims.

BRIEF DESCRIPTION OF THE DRAWING

The invention will now be described with reference to the drawing wherein:

FIG. 3 is an enlarged view, partially in section, of the clutch drum of FIG. 1, including a coupling spring according to one embodiment of the invention showing how the spring engages the drive gear for driving the fuel pump;

FIG. 4 is an enlarged view similar to the view of FIG. 3; however, here a coupling spring according to another embodiment of the invention is provided wherein the spring is arranged between the clutch drum and the drive gear;

FIG. 5 is a radial section view of another embodiment of the invention wherein a drive gear and a U-shaped coupling spring are shown, the view being taken along line V—V of FIG. 6; and, FIG. 6 is a partial view, in section, taken along line VI—VI of FIG. 5 showing the clutch drum, the drive gear and the U-shaped coupling spring.

DESCRIPTION OF THE PREFERRED EMBODIMENTS OF THE INVENTION

Figure 1:
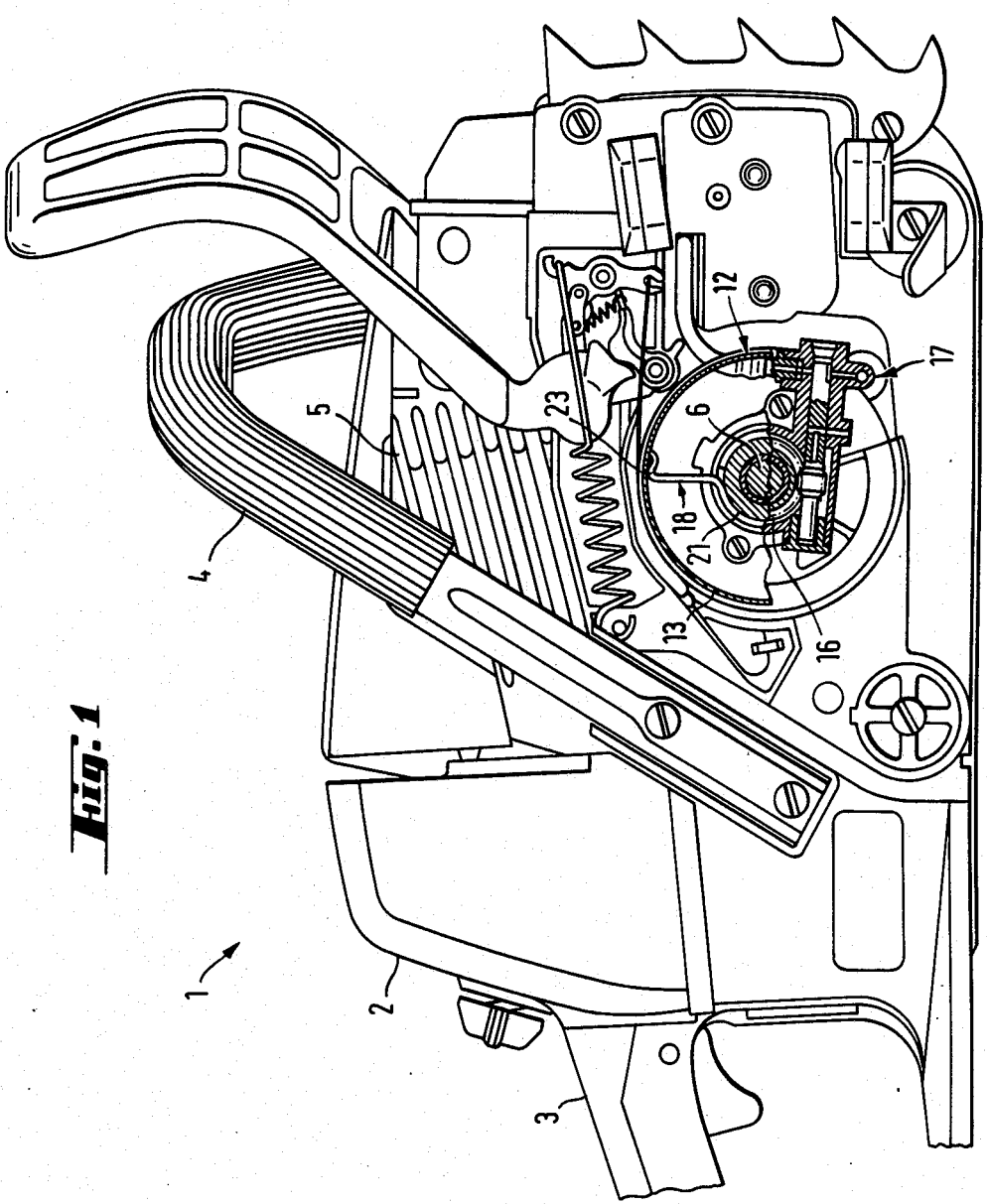
FIG. 1 is a side elevation view of a motor-driven chain saw of the invention.

The motor-driven chain saw 1 illustrated in the drawing includes a housing 2 with two handles 3, 4 and an engine 5 having a crankshaft 6 at the output end 7 of which a removable circlip 8 is provided.

Adjacent to circlip 8 on output end 7 of crankshaft 6 is a sprocket 9 which is mounted on a base wall 10 of a cup-shaped clutch drum 11. The drive sprocket 9 together with the clutch drum 11 are mounted on crankshaft 6 so as to be rotatable with respect thereto. A saw chain (not shown) of motor-driven chain saw 1 is placed over sprocket 9 to be driven by the latter. For example, if the saw chain has to be replaced, sprocket 9 can be advantageously exchanged at the same time without difficulty. For this purpose, it is only necessary to remove circlip 8 from output end 7 and pull sprocket 9 off clutch drum 11 and crankshaft 6.

The cup-shaped clutch drum 11 is part of a centrifugal clutch 12 and includes a peripheral wall 13 which encloses the centrifugal clutch inner part 14 secured to crankshaft 6 and shields the inner part 14 from the outside. When the crankshaft 6 rotates at a correspondingly high speed, the centrifugal force developed thereby causes clutch members displaceably mounted on inner part 14 to move in a radially outward direction. This outward movement forces the clutch members into pressing contact engagement with inner surface 15 of peripheral wall 13 of the clutch drum 11. As a result of this action, clutch drum 11 and sprocket 9 connected therewith are brought into rotational movement thereby propelling the saw chain. When the rotational speed of crankshaft 6 is reduced so that engine 5 runs at idle, the centrifugal clutch 12 is disengaged thereby causing clutch drum 11 and sprocket 9 to be at rest so that the saw chain too is at rest.

In addition, a drive gear 16 is rotatably journalled on crankshaft 6. The drive gear 16 is located on the other side of centrifugal clutch 12 opposite sprocket 9 so that the centrifugal clutch is arranged between the outer sprocket 9 and the drive gear 16 lying more closely to engine 5. Drive gear 16 is preferably configured as a worm gear or a spur gear and drives an oil pump 17 for supplying a suitable amount of lubricating oil to the saw chain to reduce friction and wear during operation thereof. For this purpose, drive gear 16 of pump 17 is coupled via a readily detachable insert connection which, according to a feature of the invention, advantageously engages the outer peripheral wall 13.

As detachable connection between peripheral wall 13 and the drive gear 16 of the lubricant pump 17, the arrangement of the invention includes resilient transmission member 18, 19, 20 shown in FIGS. 3, 4 and 5, respectively. In the embodiments described, different coupling springs 18, 19 or 20 are provided as connecting members. The configuration and arrangement of these embodiments will be described in more detail in the following. Resilient transmission member 18, 19, 20 is seated on crankshaft 6 so as to be concentric relative to clutch drum 11 or 46 and is in form-tight engagement with drive gear 16 or 34 of oil pump 17.

Particularly from FIG. 3, it will be seen that the coupling spring 18 of the embodiment shown includes a loop 21 closely engaging and surrounding, for example, a projection of drive gear 16; or, the loop 21 can be advantageously seated in a groove of the hub of the drive gear 16 thereby providing for frictional engagement. In this arrangement, loop 21 may be preferably seated in a circumferential groove of drive gear 16. Loop 21 is configured as a circular ring which is almost entirely closed on itself and includes a resilient strut-like extension 22 which is bent radially outwardly from loop 21 and extends in the direction of the peripheral wall 13 of the clutch drum 11 approximately in the region of the open end face of the latter. The free end of the resilient extension 22 is S-shaped thereby resulting in an approximately semicircular bracing portion 23 resting against inner wall surface 15 of peripheral wall 13 and an engaging portion 24 positively engaging a securing seat 25 in a form-tight manner. The securing seat 25 is formed in the peripheral wall 13. Preferably, coupling spring 18 with its loop 21, resilient extension 22, bracing portion 23 and engaging portion 24 are in the form of a single-piece bent wire member and may be preferably made of spring steel round wire.

Figure 2:
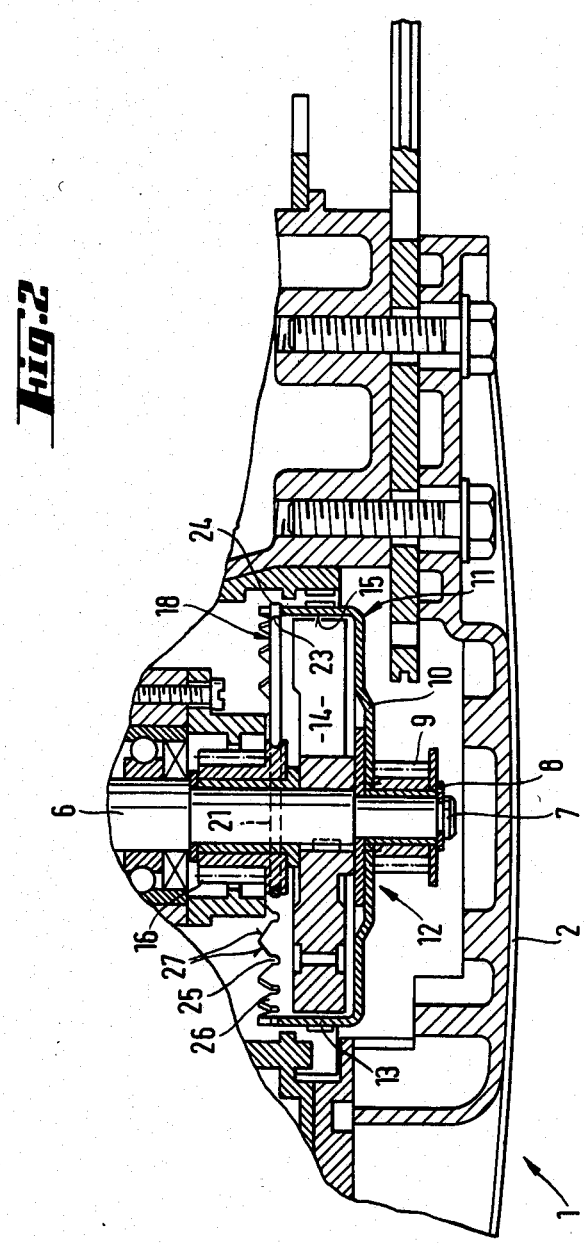
FIG. 2 is a plan view, in section, of the clutch area of the motor-driven chain saw of FIG. 1.

As will be seen from FIG. 2, the edge area of peripheral wall 13 of clutch drum 11 has a plurality of equally spaced take-along teeth 26 arranged one next to the other formed therein. The securing seats 25 are formed by spaces between each two mutually adjacent ones of the teeth 26 and are substantially configured as slots open at the edge of peripheral wall 13. The teeth 26 are configured such that their free outer end areas are tapered, thereby forming inclined edge surfaces 27 which extend and converge outwardly so that each two mutually adjacent ones of the teeth provide a guide for engaging portion 24 of the round wire coupling spring 18 when it is forcibly pushed into one of the securing seats 25 during assembly. Accordingly, to assemble the parts does not require a specific mounting position of clutch drum 11 relative to coupling spring 18; instead, clutch drum 11 and other clutch members may be slipped onto crankshaft 6 in any desired position with respect to their periphery because the narrow spacing between each two mutually adjacent ones of securing seats 25 ensures that engaging portion 24 of coupling spring 18 always engages one of the securing seats 25.

Advantageously, coupling spring 18 is arranged such that in the take-along direction, that is, in the direction of rotation A of crankshaft 6 and consequently also of clutch drum 11, coupling spring 18 has a frictional resistance relative to drive gear 16 which is higher than in the opposite direction (opening direction of loop 21) because the driving action occurs in the direction which causes loop 21 to close. As a result, drive gear 16 and thereby also the oil pump 17 are efficiently driven as the clutch drum 11 rotates.

In addition, coupling spring 18 advantageously provides an improved dampening effect when motor-driven chain saw 1 is suddenly decelerated, for example, by means of a chain brake, because the abrupt standstill of clutch drum 11 does not overload the drive, and slippage of the drive for the oil pump 17 is made possible since drive gear 16 acts on loop 21 in a direction opposite to its closing direction thereby causing the loop to open slightly which reduces the frictional resistance and permits slippage. In this way, an overload safety coupling is provided which has a very advantageous effect on the life of oil pump 17 both when accelerating and when abruptly braking the drive. Another advantage is that bearing portion 23 safely prevents coupling spring 18 from becoming radially unseated as a result of the centrifugal force, because bearing portion 23 is in firm abutment with inner surface 15 of peripheral wall 13.

In the embodiment illustrated in FIG. 4, essentially the same overload slip-coupling effect is present between clutch drum 11 and drive gear 16 as described above. The configuration and the arrangement of coupling spring 19 are, however, kinematically reversed.

The coupling spring 19 includes an outer ring portion 28 and a resilient strut-like portion 29 bent radially inwardly therefrom and an end portion configured as an engaging portion 30. As in the above-described embodiment, the coupling spring 19 too is a single-piece bent wire member made of spring-steel round wire. Engaging portion 30 engages a recess 31 of drive gear 16 thereby providing for a positive form-tight engagement. In this embodiment, the drive gear 16 is preferably configured as a worm gear. Ring portion 28 is configured so as to approximate a closed circle and its diameter is dimensioned such that it is firmly biased against inner surface 15 of peripheral wall 13 of clutch drum 11 thereby providing for frictional engagement therewith. In this arrangement, it can be suitable to guide or arrest ring portion 28 in a groove on inner wall surface 15 of peripheral wall 13.

As clutch drum 11 rotates in the direction of the arrow A, a force will act upon ring portion 28 in a direction opposite to its closing direction. As a result, ring portion 28 will abut against inner wall surface 15 of peripheral wall 13 with added force thereby causing an increase in frictional resistance. In this arrangement, the positive engagement between engaging end portion 30 and drive gear 16 causes the latter to rotate and actuate the pump 17. When the saw chain is decelerated abruptly with clutch drum 11 coming to a standstill, the frictional resistance between ring portion 28 and inner surface 15 is reduced to permit slippage for overload protection.

Within the scope of the invention, it can also be advantageous with regard to the two coupling springs 18, 19 to provide exclusively for frictional engagement at both drive gear 16 and peripheral wall 13 of clutch drum 11 to permit still greater slippage while maintaining a functionally durable drive connection. Moreover, it can be an advantage to configure and arrange coupling springs 18, 19 such that their two respective ends are in positive latched engagement with both drive gear 16 and peripheral wall 13 of clutch drum 11. While not permitting slippage, this arrangement nevertheless affords favorable dampening under overload conditions so that reliable protection is likewise ensured. By suitably shaping coupling springs 18, 19, it is possible to achieve a correspondingly long dampening travel.

In the embodiment illustrated in FIGS. 5 and 6, coupling spring 20 is a U-shaped spring steel clip secured to a perforated circular base plate 33 of drive gear 34. The perforations in base plate 33 are indicated by reference numeral 32. To drive oil pump 17, drive gear 34 has a toothed rim 35 formed integrally with base plate 33 which is preferably made of plastic. As with drive gear 16 previously described, drive gear 34 is rotatably journalled on crankshaft 6. In this embodiment, the diameter of base plate 33 is approximately twice the diameter of toothed rim 35 of drive gear 34. On the rear side of base plate 33 opposite toothed rim 35 is a recess 36 into which the lower bent portion of U-shaped coupling spring 20 is contained and seated.

In this arrangement, the curved portion of U-shaped coupling spring 20 is supported upon the bottom boundary surface of recess 36. Recess 36 is closed by a cover plate 37 preferably made of sheet metal and seated on the hub of spur gear 34 thereby holding coupling spring 20 in position in recess 36. Cover plate 37 is secured to drive gear 34 by means of a screw 38 having its head 39 seated in a cup-shaped deformed portion 40 of cover plate 37. The deformed portion 40 is disposed in the bent portion of U-shaped coupling spring 20.

It is also possible to mount spring 20 in cover plate 37. For this purpose, drive gear 34 may be reduced to its outside diameter, whereas the outside diameter of cover plate 37 is increased. In an embodiment using a round spring 18 seated in a groove of the hub of spur gear 34, it is further conceivable to have round spring 18 support cover plate 37 axially.

Recess 36 extends up to the outer periphery of base plate 33 and defines two approximately radially extending abutment surfaces 41 slightly diverging away from each other approximately in the shape of a V in the direction of the outer periphery of base plate 33. The lengths of the two approximately parallel free legs 42 of U-shaped coupling spring 20 are so dimensioned that their ends are in the outer peripheral area of base plate 33. Approximately in the longitudinal center area of coupling spring 20, a spacer strut 43 formed on base plate 33 is provided between the two legs 42. Between the free ends of legs 42 which are configured as engaging portions 44 is the protruding holding seat 45 of clutch drum 46. Holding seat 45 is configured as a projection formed on peripheral wall 47. Free spaces 48 are provided between the two legs 42 of coupling spring 20 lying against holding seat 45 and the two abutment surfaces 41 of recess 36, respectively. The clearances 48 conjointly defined by legs 42 and corresponding ones of surfaces 41 permit sufficient deflection of spring legs 42 to dampen the action of the accelerating and decelerating forces thereby providing overload protection.

The outer periphery of base plate 33 of drive gear 34 corresponds substantially to the outer periphery of clutch drum 46. This ensures safe assembly because clutch drum 46 can be connected with drive gear 34 only if the projection or seat 45 of peripheral wall 47 is between the two resilient legs 42; otherwise, the peripheral edge of base plate 33 would not allow the assembly. Resilient legs 42 effect a dampening action for the drive of oil pump 17 by utilizing the respective clearances 48 and will not come to rest against abutment surfaces 41 until after the main impact is absorbed by U-shaped coupling spring 20. The clutch drum 46 becomes very hot and it is another advantage of this arrangement that clearances 48 between legs 42 of coupling spring 20 and abutment surfaces 41 of drive gear 34 provide protection against a direct transfer of heat from clutch drum 46 to drive gear 34. A direct transfer of heat is thus avoided thereby permitting drive gear 34 to be advantageously made of plastic and this situation exists even in view of the very high temperatures to which clutch drum 46 is exposed.

Within the scope of the invention it may also be advantageous to provide not only one but several coupling springs 18, 19, 20 in each of the above-described embodiments. Equally, it is possible to provide coupling springs 18, 19 for use with a drive gear 34 having a toothed rim for driving oil pump 17. The possibility exists also to use U-shaped coupling spring 20 with a drive gear 16 that is configured as a worm gear. In the foregoing, the dampening of the drive for oil pump 17 was described for use with a motor-driven chain saw 1. However, dampening the drive for an oil pump 17 as disclosed herein may also be applied to other motor-driven devices requiring, for example, additional lubrication during operation.

Simple construction and ease of assembly are the essential advantages of the motor-driven chain saw 1 of the invention, since the clutch drum 11, 46 can be axially pulled off from crankshaft 6 without requiring complicated removal of other parts. In addition, outwardly disposed sprocket 9 can be exchanged easily when required without the need to disassemble the centrifugal clutch. The detachable insert connection between drive gear 16, 34 and peripheral wall 13, 47 provides a simple and safe insert assembly of the parts on crankshaft 6 which, of course, also permits rapid disassembly of the parts for maintenance purposes.

It is understood that the foregoing description is that of the preferred embodiments of the invention and that various changes and modifications may be made thereto without departing from the spirit and scope of the invention as defined in the appended claims.

What is claimed is:

1. A motor-driven chain saw equipped with a saw chain and a guide bar for guiding the movement of the saw chain thereon, comprising:
   a housing;
   a drive motor mounted in said housing and having a motor drive shaft;
   pump means for pumping lubricating oil for lubricating the saw chain and the guide bar;
   driven means for engaging and driving said pump means, said drive means being rotatably journalled on said drive shaft;
   sprocket means rotatably journalled on said output shaft for driving said saw chain around the periphery of said guide bar;
   clutch means for operatively connecting said drive shaft to said sprocket means, said clutch means including a cup-shaped clutch drum attached to said sprocket means, said clutch drum having a base wall defining a first plane perpendicular to said drive shaft and having a peripheral wall extending outwardly from said base wall so as to be coaxial with said drive shaft, said clutch drum being rotatably journalled on said drive shaft so as to at least partially overlap said drive means in spaced relationship thereto; and, a resilient coupling spring for resiliently coupling said drive means to said peripheral wall of said clutch drum, said coupling spring lying in a second plane substantially parallel to said first plane thereby providing an axially compact arrangement of said drive means and said clutch drum on said drive shaft.

2. The motor-driven chain saw of claim 1, said drive means being a drive wheel engaging said pump means for actuating the latter.

3. A motor-driven chain saw equipped with a saw chain and a guide bar for guiding the movement of the saw chain thereon, comprising:

a housing;

a drive motor mounted in said housing and having a motor drive shaft;

pump means for pumping lubricating oil for lubricating the saw chain and the guide bar;

drive means for driving said pump means, said drive means being rotatably journalled on said drive shaft, said drive means being a drive wheel engaging said pump means for actuating the latter;

sprocket means rotatably journalled on said output shaft for driving said saw chain around the periphery of said guide bar;

clutch means for operatively connecting said drive shaft to said sprocket means, said clutch means including a clutch drum having a peripheral wall; and, detachable torque transmission means for operatively connecting said drive means to said peripheral wall of said clutch drum, said detactable torque transmission means including a coupling spring for transmitting torque from said clutch drum to said drive wheel, said coupling spring having a first end portion, said clutch drum being cup-shaped and having an open end face;

said clutch drum being mounted on said drive shaft so as to cause said open end face to face toward said pump means and said drive wheel; said sprocket means being disposed on the side of said clutch drum facing away from said pump means and on the outer end portion of said drive shaft, said peripheral wall of said clutch drum defining first coupling spring receiving means at the region of said open end face for receiving said first end portion of said coupling spring therein.

4. The motor-driven chain saw of claim 3, said coupling spring being an elongated member also having a second end portion, said drive wheel having second coupling spring receiving means for receiving said second end portion of said coupling spring.

5. The motor-driven chain saw of claim 4, said second coupling spring receiving means being configured to hold said second end portion concentrically to said drive shaft.

6. The motor-driven chain saw of claim 5, said second coupling spring receiving means being configured so as to hold said second end portion in a force-tight manner.

7. The motor-driven chain saw of claim 4, said first coupling spring receiving means being a latch opening formed in the edge portion of said peripheral wall; said first end portion of said coupling spring being in form-tight holding engagement with said latch opening; said second end portion of said coupling spring being configured to form a loop, said second coupling receiving means being a circular surface formed on said drive wheel for receiving said loop thereon.

8. The motor-driven chain saw of claim 7, said coupling spring having a resilient portion extending radially outwardly away from said loop, said first end portion being formed at the radial end of said resilient portion.

9. The motor-driven chain saw of claim 8, said first end portion and resilient portion conjointly defining a bent portion having an S-shaped configuration so as to permit said bent portion to brace against the inner wall surface of said peripheral wall thereby preventing said first end portion from becoming dislodged from said latch opening in response to centrifugal force.

10. The motor-driven chain saw of claim 9, said first end portion, said resilient portion, said bent portion and said second end portion conjointly defining a single piece of spring steel round wire.

11. The motor-driven chain saw of claim 7, said latch opening being an open slot formed in said edge portion.

12. The motor-driven chain saw of claim 11, said edge portion of said peripheral wall being castellated to define a plurality of said open slots about the entire periphery of said edge portion of said peripheral wall, each one of said open slots being adapted to receive said first end portion of said coupling spring.

13. The motor-driven chain saw of claim 12, the castellated edge portion of said peripheral wall being defined by a plurality of projections one next to the other, each two mutually adjacent ones of said projections defining one of said open slots, the edges of each two mutually adjacent ones of said projections being tapered so as to narrow inwardly toward the base of the slot defined by said edges whereby the insertion of said first end portion of said coupling spring into the slot is facilitated.

14. The motor-driven chain saw of claim 4, said first coupling spring receiving means being formed on the inner wall surface of said peripheral wall for receiving said first end portion of said coupling spring thereagainst in a force-tight manner, said second coupling spring receiving means being a recess formed in said drive wheel for receiving said second end portion of said coupling spring therein in a form-tight manner.

15. The motor-driven chain saw of claim 14, said first end portion being in the form of a circle dimensioned so as to be spring biased against said inner wall surface thereby providing frictional engagement therebetween, said second end portion being bent radially away from said first end portion for engaging said recess in a form-tight manner.

16. The motor-driven chain saw of claim 15, said first end portion and said second end portion conjointly defining a single piece of spring steel round wire.

17. The motor-driven chain saw of claim 1, said drive means comprising a base plate rotatably journalled on said drive shaft; and, a driven wheel arranged on said base plate for driving said pump means; said coupling spring being mounted on said base plate and connected to said peripheral wall of said clutch drum.

18. The motor-driven chain saw of claim 17, said coupling spring having a U-shaped configuration; said peripheral wall having an outer edge adjacent said base plate and having a projection extending outwardly from said outer edge; the free ends of said U-shaped coupling spring being in latching and form-tight engagement with said projection thereby resiliently connecting said base plate to said clutch drum.

19. The motor-driven chain saw of claim 18, said base plate having a recess for receiving said U-shaped coupling spring therein; and, said drive means further comprising a cover plate configured to close said recess and to journal said coupling spring in said recess.

20. The motor-driven chain saw of claim 19, said recess having a U-shaped configuration formed so as to have edges adjacent respective ones of the legs of said U-shaped coupling spring, said edges being tapered so as to diverge away from said legs, respectively, to form respective V-shaped spaces between said legs and said recess edges thereby permitting resilient movement of said legs of said coupling spring relative to said base plate in response to acceleration forces imparted to said coupling spring by said clutch drum thereby protecting said drive means and said pump means against excessive wear.

21. The motor-driven chain saw of claim 20, said base plate including a spacer disposed between the mutually adjacent legs of said U-shaped coupling spring.

22. A motor-driven chain saw equipped with a saw chain and a guide bar for guiding the movement of the saw chain thereon, comprising:

a housing;

a drive motor mounted in said housing and having a motor drive shaft;

pump means for pumping lubricating oil for lubricating the saw chain and the guide bar;

drive means for driving said pump means, said drive means being rotatably journalled on said drive shaft;

sprocket means rotatably journalled on said output shaft for driving said saw chain around the periphery of said guide bar;

clutch means for operatively connecting said drive shaft to said sprocket means, said clutch means including: a cup-shaped clutch drum connected to said sprocket means and being rotatably journalled on said drive shaft; and, centrifugal weight means for engaging said clutch drum and sharply accelerating the latter to a predetermined rotational speed whereby the torque of said drive shaft is transmitted to said clutch drum and said sprocket means;

said clutch drum having a base wall defining a first plane perpendicular to said drive shaft and having a peripheral wall extending outwardly from said base wall so as to be coaxial with said drive shaft and overlap said centrifugal weight means, said peripheral wall extending outwardly from said base wall still farther so as to at least partially overlap said drive means in spaced relationship thereto;

resilient torque transmission means for resiliently transmitting torque from said peripheral wall of said clutch drum to said drive means for rotatively driving the latter and for transmitting said last-mentioned torque so as to prevent the sharp acceleration of said clutch drum from being transmitted to said drive means thereby protecting said drive means and said pump means from excessive wear; and, said resilient torque transmission means lying in a second plane substantially parallel to said first plane thereby providing an axially compact arrangement of said drive means and said clutch drum on said drive shaft.

* * * * *

UNITED STATES PATENT AND TRADEMARK OFFICE
CERTIFICATE OF CORRECTION

PATENT NO. : 4,662,071
DATED : May 5, 1987
INVENTOR(S) : Klaus Höppner et al

It is certified that error appears in the above-identified patent and that said Letters Patent is hereby corrected as shown below:

On the front page in the title: delete "MOTOR-DRIVE" and substitute -- MOTOR-DRIVEN -- therefor.

In column 1, in the title: delete "MOTOR-DRIVE" and substitute -- MOTOR-DRIVEN -- therefor.

In column 6, line 54: delete "driven" and substitute -- drive -- therefor.

In column 7, line 34: delete "detactable" and substitute -- detachable -- therefor.

In column 8, line 57: delete "driven" and substitute -- drive -- therefor.

Signed and Sealed this

Fifteenth Day of September, 1987

*Attest:*

DONALD J. QUIGG

*Attesting Officer*     *Commissioner of Patents and Trademarks*